Dec. 2, 1952 K. A. B. PETTERSSON 2,620,193
RECORD SELECTOR FOR PHONOGRAPHS
Filed Nov. 26, 1948 9 Sheets-Sheet 1

Fig 1.

Inventor.
K. A. Bertil Pettersson,
by Young, Emery & Thompson
Attorneys

Fig 2.

Dec. 2, 1952 K. A. B. PETTERSSON 2,620,193
RECORD SELECTOR FOR PHONOGRAPHS
Filed Nov. 26, 1948 9 Sheets-Sheet 5

Inventor.
K. A. Bertil Pettersson.
by Young, Emery & Thompson
Attorneys

Patented Dec. 2, 1952

2,620,193

UNITED STATES PATENT OFFICE 2,620,193

RECORD SELECTOR FOR PHONOGRAPHS

Karl Albin Bertil Pettersson, Orebro, Sweden

Application November 26, 1948, Serial No. 61,978
In Sweden December 8, 1947

6 Claims. (Cl. 274—10)

The present invention relates to a record selector for phonographs. With this selector it is possible to cause a selected side of a record to be played by closing a corresponding contact automatically or manually. As in known record selectors the records are placed between plates or rings and are stacked upon the turntable where they are selected by means of two gripping jaws movably arranged on opposite sides of the turntable. These jaws raise the portion of the stack located above the selected record and divide the same into two parts, so that the tone arm is free to move in between the same. As in other similar phonographs the said plates have a somewhat larger diameter than the records and are provided on both sides with recesses so that a space for receiving a record is formed between two such plates. Furthermore, the plates are provided with a central aperture and have such a profile that they are firmly gripped by the jaws.

The record selector also includes a device for turning the stack of records so that, if the selected side of a record is so located that the record must be turned in order to be played, all records and plates are first turned upside-down whereupon the overlying records and plates are raised and the music is played.

When turning the stack upside-down the position of the records therein is changed. The topmost record will be located at the bottom, the record which is next to the topmost one will be located next to the bottom record, and so on. The selector therefore is arranged in such a manner that the selecting positions of the jaws are correspondingly changed when the stack is turned.

Other arrangements will appear from the following detailed description.

A preferred embodiment of the invention is illustrated in the accompanying drawings, wherein:

Figs. 17 and 20 show a control mechanism for a change-over switch.

Figure 1:
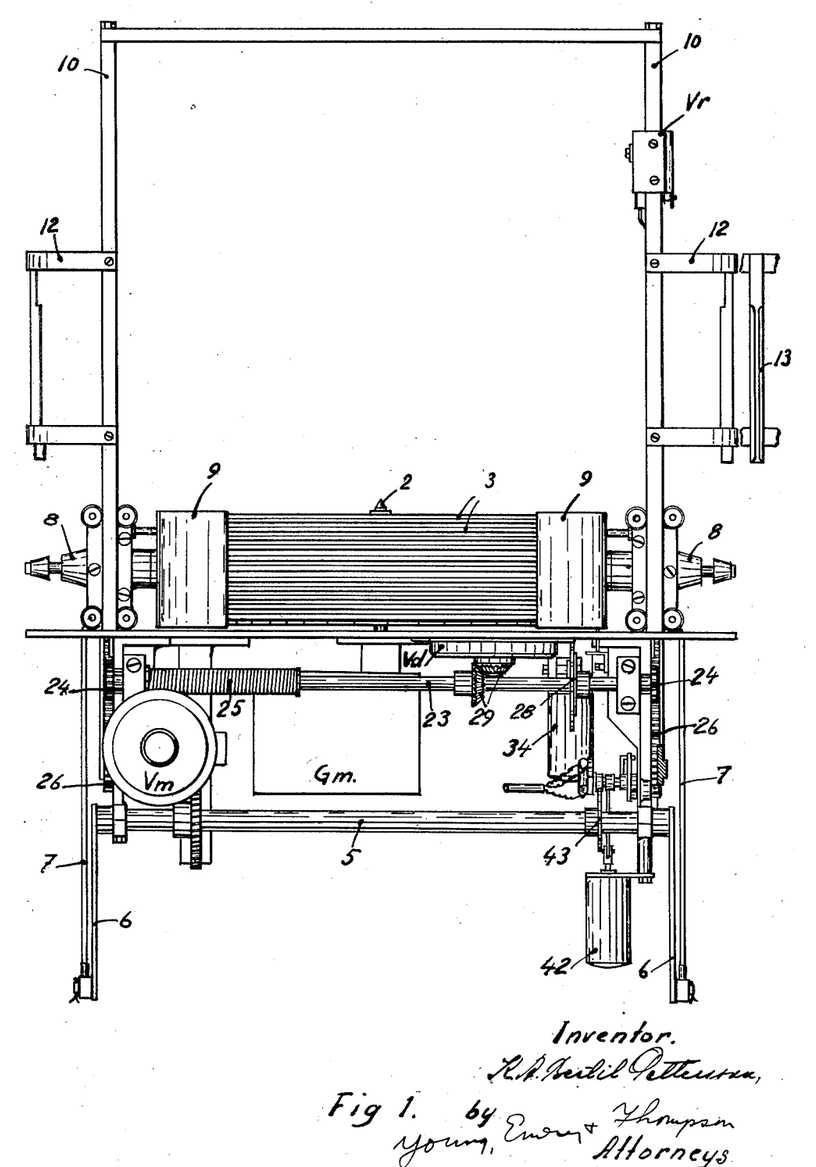
Fig. 1 is a front view of the selector.
Figure 2:
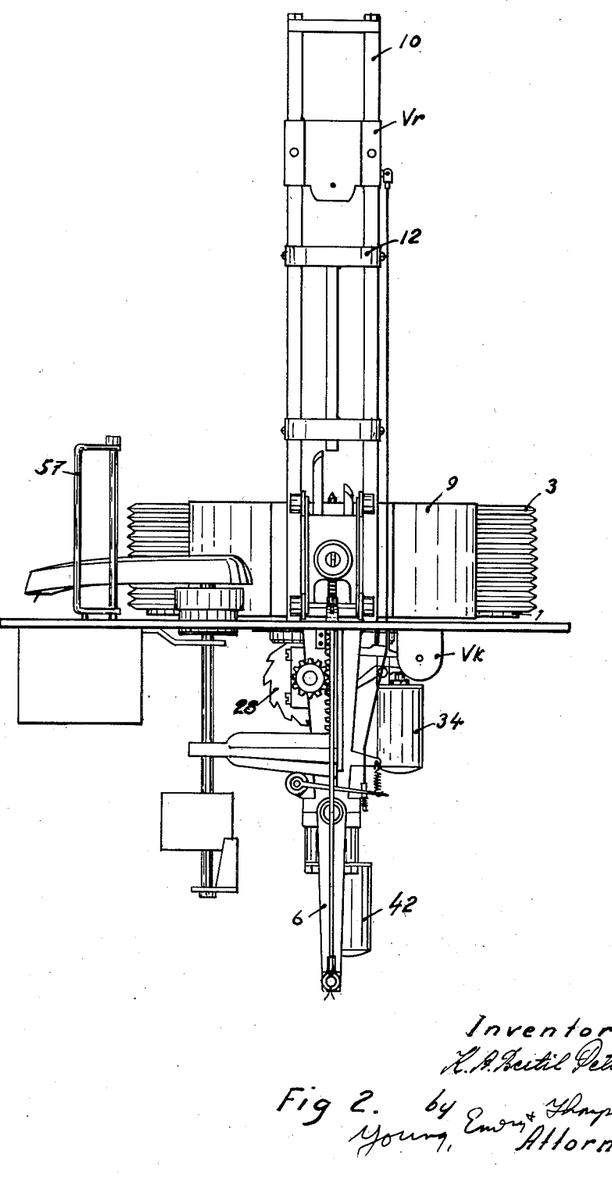
Fig. 2 is a side view of the same with the selector motor, the gear and the tone arm shown in dotted lines.

As shown in Figs. 1 and 2 the phonograph has a turntable 1 (Fig. 2) which is driven by a motor $Gm$ (Fig. 1). Through a telescopic shaft provided with universal joints this shaft drives an automatic tone arm. The tone arm with its mechanism is mounted upon an arm, fixed to a rack 26, and is raised by the latter so that the tone arm is always held on a level with the selected record. The telescopic shaft is not shown in the drawing, but the tone arm and associated parts are shown in dotted lines. The turntable is provided with a guiding pin 2 (Fig. 1) at its centre. The upper end thereof projects from the stack which is composed of plates 3 and records placed between the plates. On opposite sides of the stack gripping jaws 9 are arranged, each mounted on its sliding carriage 8. These carriages 8 are slidable upon rail structures 10 mounted on opposite sides of the turntable. The sliding carriages are connected to a crank mechanism through raising arms 7. The crank mechanism comprises a shaft 5 and a crank 6 mounted at each end thereof and is driven from a separate motor $Vm$ through a gear. By means of this device the sliding carriages 8 are simultaneously moved on the structures 10 when the crank mechanism is rotated.

By means of a gripping and turning mechanism to be described more closely hereinafter the jaws are slidably and rotatably mounted in their carriages. The structure 10 is so arranged that the jaws, when moved towards each other to gripping position, grip the stack or part of the same. In the open position, when they are moved apart, they may move vertically without interfering with the stack. The gripping and turning movements of the jaws are controlled by a selector mechanism provided with a device for controlling the turning. Details of this mechanism shown in Fig. 1 are a shaft 23 with two pinions 24 each engaging a rack 26, the teeth of the racks not being shown. On the shaft 23 there is a coiled spring 25 and a ratchet wheel 28 (Fig. 2). V$d$ is a selector box which is driven from the shaft 23 through two conical gears 29. Two electromagnets are designated 34 and 42, respectively. The first 34 of these controls the selector mechanism and the second 42 controls the selector motor V$m$. On the right portion of the structure 10 there is a turning controller V$r$.

This controls the turning mechanism in the jaw 9. Safety means are designated 12 and are intended to lock the jaws in the gripping position immediately above their uppermost selecting position in order to prevent the jaws from dropping the records. As indicated in Figs. 1 and 2 the locking of the jaws by the member 12 will take place when the jaws with the record carriers are adjusted upwardly, whereby the rod 13 engages the end of the carriage 8 so that in this manner the jaws will be prevented from rotating. A frame designated 57 is actuated by the tone arm. This frame cooperates with a contact device to be described hereinafter. The selector is controlled electrically from a switchboard with push buttons, for instance. Depression of the push button corresponding to the desired piece of music causes the selector motor to be started. If the desired piece of music is correctly placed for the playing, the jaws are moved upwards in their open position until they have reached the position of the selected record. Thereupon they are moved to the gripping position and raise the portion of the stack located above the selected record. When this portion has been raised sufficiently, the selector motor is switched off automatically and the phonograph motor is switched on. The piece of music is played by the tone arm which, when the playing is completed, returns to its initial position. Hereby it actuates the frame 57 which through the contact device starts the selector motor. The jaws are lowered and place the raised portion of the stack on its place, whereupon they return to their open position and slide downwards to their initial position. If, on the other hand, the record with the selected piece of music is incorrectly placed, the jaws grip the whole stack of records, raise the same and turn it upside-down whereupon they place it on the turntable and selection occurs as described above.

Figures 3, 4, 5:
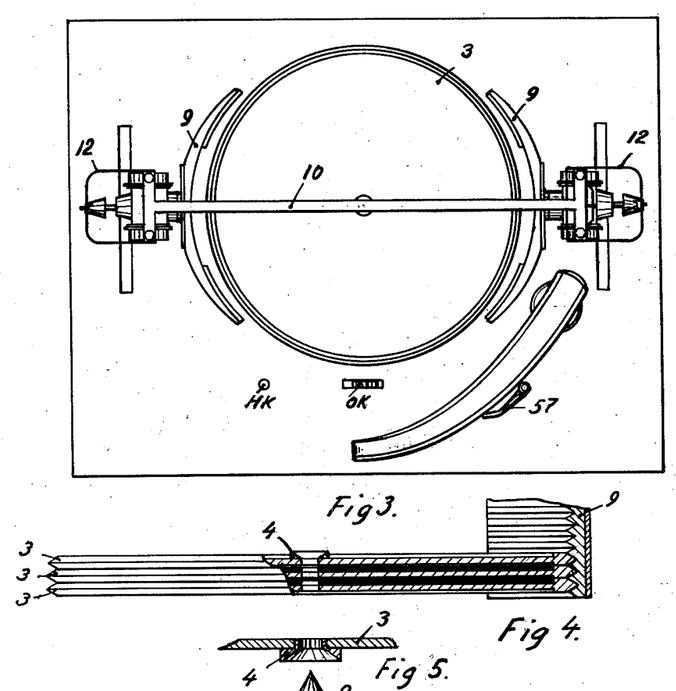
Fig. 3 is a plan view of the selector.
Fig. 4 shows the construction of the plates and the arrangement of the records between the same.
Fig. 5 shows guiding means for the upper and lower plate.
Figure 11:
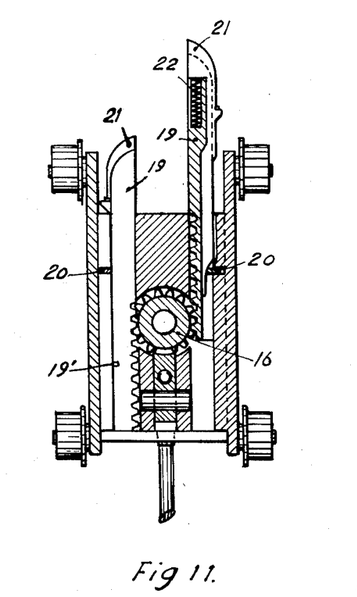
Fig. 11 is a cross-sectional view on line B—B of Fig. 10, showing the turning mechanism.
Figure 12:
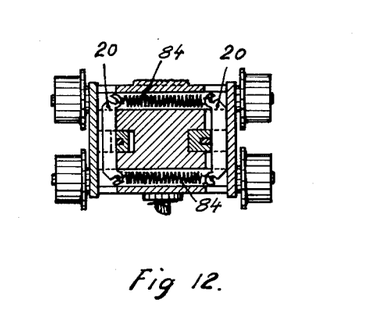
Fig. 12 is a cross-sectional view on line C—C of Fig. 8, showing details of a locking device for the turning mechanism.

Each jaw 9 must be provided with a gripping mechanism, whereas preferably only one of them has a turning mechanism. Figs. 8 to 12 show a jaw with gripping and turning mechanisms. The jaw proper is bow-shaped with about the same radius of curvature as the stack and its gripping portions are similarly profiled as the latter. Thus the jaw may grip the whole stack or part of it only, Fig. 4. The jaw is fixedly mounted on a shaft 17 which is slidably and rotatably arranged in the sliding carriage 8. A stop member 18 on the shaft 17 stops the forward movement of the jaw when stack has been gripped simultaneously as the two jaws in the gripping position are equally spaced from the centre of the turntable. The shaft 17 carries a cog roll 16. In this cog roll a number of grooves of cog profile are cut at right angles to the cogs. The cog roll has two functions. Firstly it may serve as a pinion and, secondly, it may serve as a rack in all angular positions. The cogs on the cog roll are engaged by two displaceable racks 19 and by a toothed sector 14. This toothed sector is pivotally mounted in the sliding carriage 8, and from Fig. 9 it is seen that a displacement of the raising arm 7 in upward or downward direction will cause the jaw to be moved forth or back. The racks 19 with notches 19' move in grooves in the sliding carriage on opposite sides of the cog roll 16. The arrangement is shown in Fig. 11. By depressing that rack 19 which is most elevated to its bottom position, the cog roll and thus also the jaw may be rotated through 180° simultaneously as the other rack is moved upwards. If the other rack is depressed, the jaw is turned through 180° but in the opposite direction. In order that the jaw shall remain in its position after the turning thereof is completed and until a new turning is effected by depressing the proper rack, the racks 19 are locked in their projecting or outer positions. This locking is effected by means of two locking members 20 (Fig. 12), each arranged in its groove in the sliding carriage 8. Each locking member is urged against the rear side of the corresponding rack 19 by springs and engages a notch therein when the rack is in its outer position. For releasing the rack when the same is to be depressed for rotating the jaw each rack is provided with a locking rail 21 (Fig. 11) which projects somewhat at the upper end of the rack. The locking rail is mounted in a longitudinal groove in the rear side of the rack. The right hand rack of Fig. 11 is shown in section to illustrate the mode of operation of the locking device. The locking member is in its groove in the sliding carriage just where the locking rail is reduced in section at its lower end and engages the afore-mentioned notch in the rack so that this is locked as are of course also the remaining portions of the turning mechanism. When the locking rail is depressed the same moves the locking member out of engagement with the rack so that the rack is released and may be depressed. When the opposite rack reaches its outermost position its locking member slides into the corresponding notch and the turning mechanism is again locked. A spring 22 is adapted automatically to return the locking rail to its initial position when the pressure ceases. Fig. 9 shows a guiding pin 11. This serves to guide the jaw in an absolutely correct path towards the records in the stack. In the gripping position the jaw is out of engagement with the guiding pin and may be turned freely by the turning mechanism.

Figure 6:
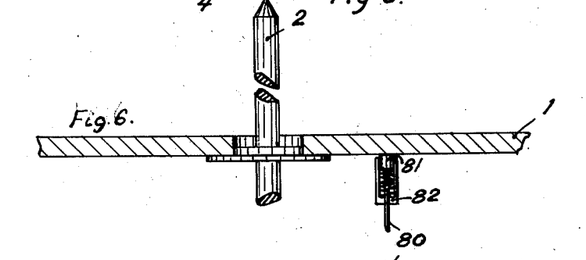
Figs. 6 and 7 show the turntable with a central pin and a braking means.
Figure 7:
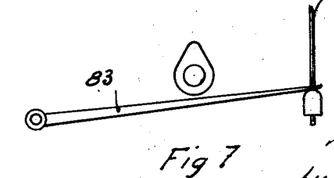

A braking device acting on the turntable is shown in Figs. 6 and 7. The same is controlled by the shaft of the crank mechanism. The turntable is free to move when the crank mechanism is in its upper dead center.

The braking device consists of a shoe member 81 mounted to slide in a socket 82 on the end of a control rod 80. The rod 80 is actuated by a lever 83 actuated by a cam.

Figure 13:
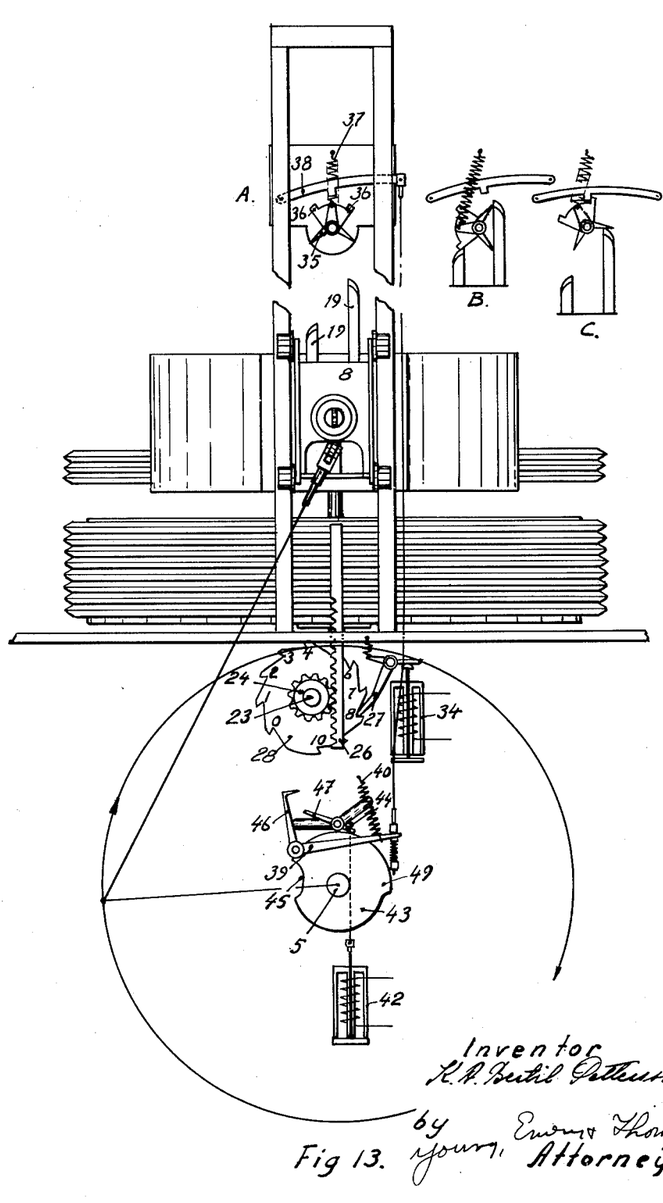
Fig. 13 is a diagrammatical view of the selector mechanism with a turning control means and a twin contact with its cam disc.
Figure 14:
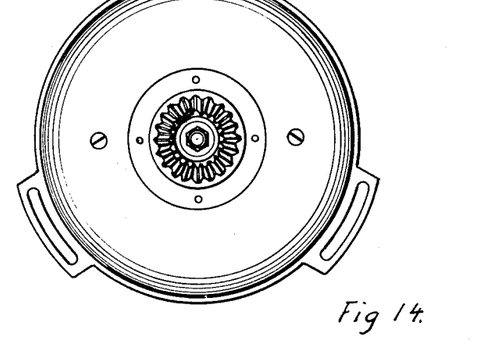
Figs. 14, 15 and 16 are different views of the selector box.
Figure 15:
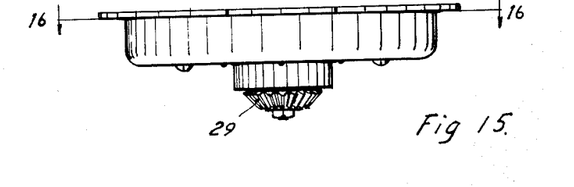

The selector mechanism comprises the shaft 23 with the pinions 24, as stated above. These pinions engage the racks 26 (Fig. 1) which are moved by the same. The spring 25 tends to rotate the shaft in such a direction that the racks are moved upwards. Fig. 13 clearly shows the selector mechanism but only one rack with its pinion is visible therein. The racks may be stopped in certain positions by an electrically operated pawl 27 cooperating with the ratchet wheel 28. This wheel has as many teeth as there are records in the stack. Furthermore the division is such that rotation of the ratchet wheel by one tooth corresponds to a displacement of the racks equal to the thickness of a record. The racks are so arranged that their upper ends engage the corresponding sliding carriages and raise the same when moved upwards. In Fig. 9 the arrow P indicates the place where the rack engages the sliding carriage. From the construction of the gripping mechanism it will be clear that if the sliding carriage is raised by the rack and the raising arm 7 remains in its position the jaw is moved from the gripping position to an open position. Assuming now that the crank mechanism is rotated thus moving the raising arms upwards, the spring 25 will be able to turn shaft 23 and to move the racks 26 and thus also the corresponding sliding carriage upwards with the jaw in the open position. If the pawl 27 is caused to engage a tooth on the ratchet wheel 28, the selector mechanism is stopped. Since the upwards movement of the rack 26 has been stopped, the raising arm now first moves the jaw into the gripping position and then, when this position has been attained, it moves the sliding carriage further upwards. After the crank mechanism has reached its upper dead center the sliding carriage is lowered and is stopped by the rack, when engaging the same, and the raising arm moves the jaw into the open position at the same point where it was previously moved to gripping position. Then the sliding carriage is pulled down to its initial position (crank mechanism at its lower dead center). The rack is depressed and causes the shaft 23 to rotate but now in the opposite direction, whereby the spring 25 is wound up for the next selecting operation. In the starting or initial position of the selector the pawl 27 should be quite free in the first notch of the ratchet wheel 28 so that it may be actuated by the electromagnet 34. The first notch in the ratchet wheel is designated 0 in Fig. 13 and corresponds to the turning position of the selector. When the selector mechanism is stopped in the 0-position the jaws grip the whole stack of records.

Figure 16:
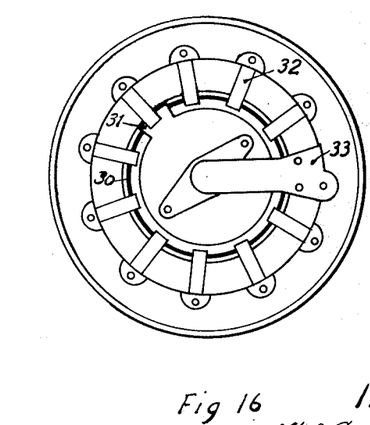

The shaft 23 through the conical gears 29 drives also a circular contact rail 30 with a break position 31 arranged in the selector box, Fig. 16. A number of contact tongues are in direct contact with the rail and are successively thrown out by the breaking notch therein when the rail is turned. Through a spring 33 the rail is electrically connected to a rectifier L and the tongues are connected to control switches M$k$, Fig. 21. The selector box V$d$ and the electromagnet 34 are connected in series during a selecting operation and so interrelated that the desired contact tongue 32 is thrown out and the pawl 27 is caused to drop somewhat ahead of the desired notch in the ratchet wheel 28.

If, for instance, the upper side of the eighth phonograph record is selected, the circuit is closed through the eighth contact tongue, and the pawl 27 (Fig. 13) is moved out of engagement with the ratchet wheel 28 by the electromagnet 34. The selector mechanism now raises the jaws in their open position (crank mechanism turning in the direction of the arrow). Simultaneously the rail 30 in the selector box is turned and when the breaking notch 31 reaches the said contact tongue the circuit is broken and the pawl engages the ninth notch (notch No. 8) in the ratchet wheel so that the selector mechanism is stopped. In the first notch, or the 0-position, no contact tongue is thrown out by the breaking notch. The racks 26 have then raised the jaws a distance equal to eight teeth of the ratchet wheel or to the total thickness of eight records. The gripping position of the jaws has been similarly displaced upwards. Consequently the jaws skip over eight records and raise the rest so that the eighth record is free to be played.

The above-mentioned turning mechanism for the jaw is controlled by the turning controller V$r$ and the change-over switch V$k$. The turning controller, Fig. 13, which is arranged in the upper portion of the structure 10 (Fig. 1), comprises a movable wing 35 with two lugs 36. A spring 37 tends to retain the same in its initial position. The wing which lies in front of the sliding carriage may be locked by means of a locking member 38 cooperating with the lugs 36. The locking member is controlled by the rack 26 of the selector mechanism through a line and an arm 39. The lower end of the rack rests upon the arm 39 in the starting position of the selector, and the locking member is then in a position to engage the lugs 36. From the first selector position (notch No. 1 in the ratchet wheel 28, Fig. 13) and onwards the rack has been moved upwards sufficiently that the arm 39 under the influence of a spring 40 has raised the locking member 38 out of the position for engagement with the lugs 36, Fig. 13A. If the sliding carriage is moved upwards that rack 19, which is in its elevated position, strikes the wing 35. If the locking member 38 is out of engagement with the lugs no turning is obtained. The wing only turns Fig. 13B. If, on the other hand, the locking member is in the position for engagement with the lugs (selector mechanism stopped in the 0-position) the movement of the wing is stopped by either lug, Fig. 13C. Therefore the rack 19 after the locking rail thereof has been depressed will be urged to its bottom position so that the jaw turns the stack upside-down. The other jaw which has no turning mechanism participates in this turning movement.

Figures 8, 10:
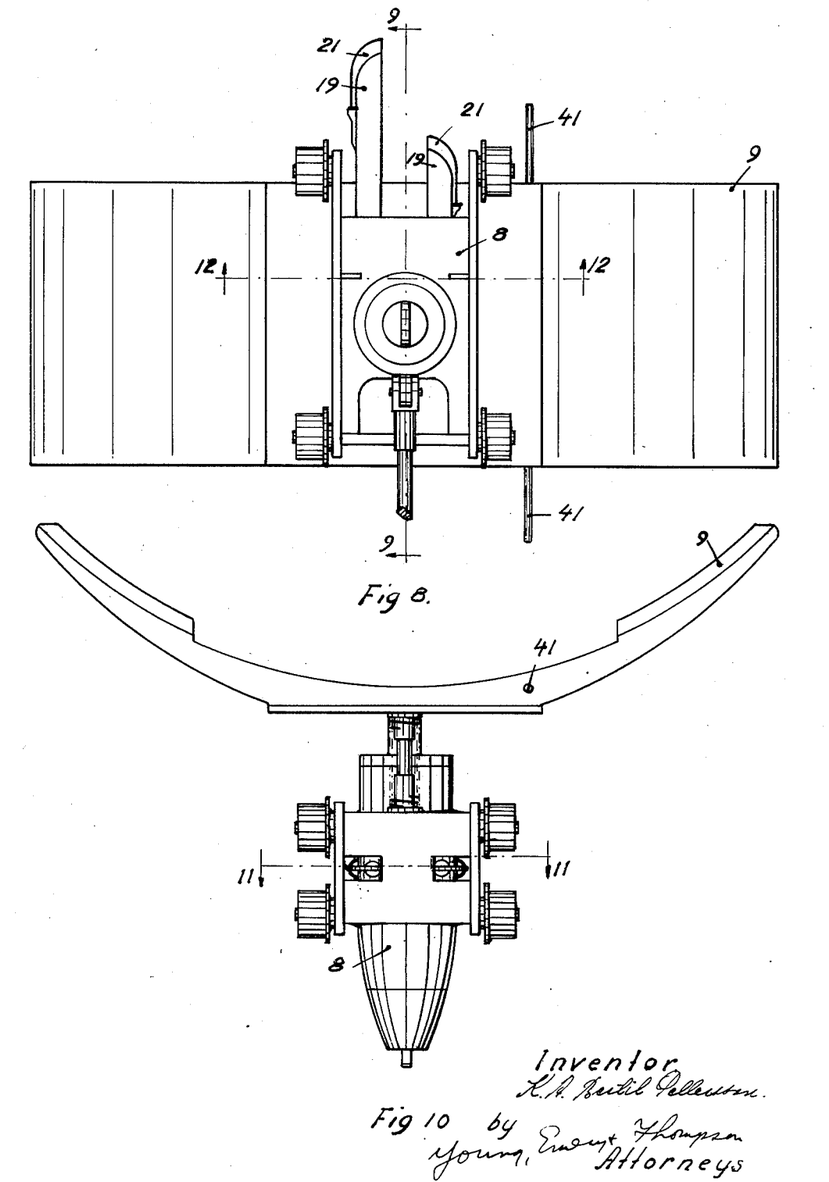
Fig. 8 shows a jaw provided with a gripping and turning mechanism.
Fig. 10 is a plan view of the device shown in Fig. 8.
Figure 9:
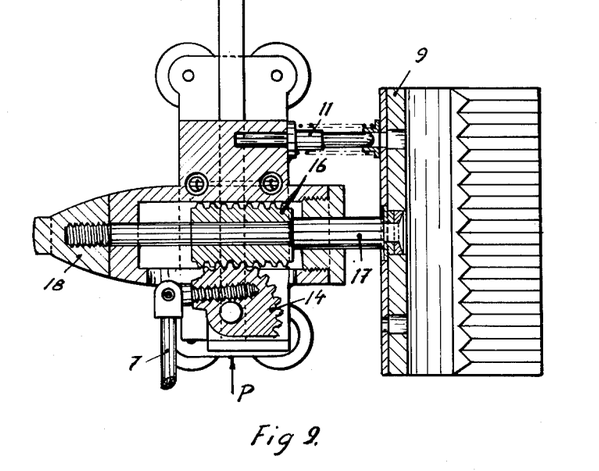
Fig. 9 is a cross-sectional view on line A—A of Fig. 8.
Figure 20:
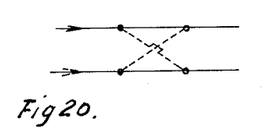
Figure 21:
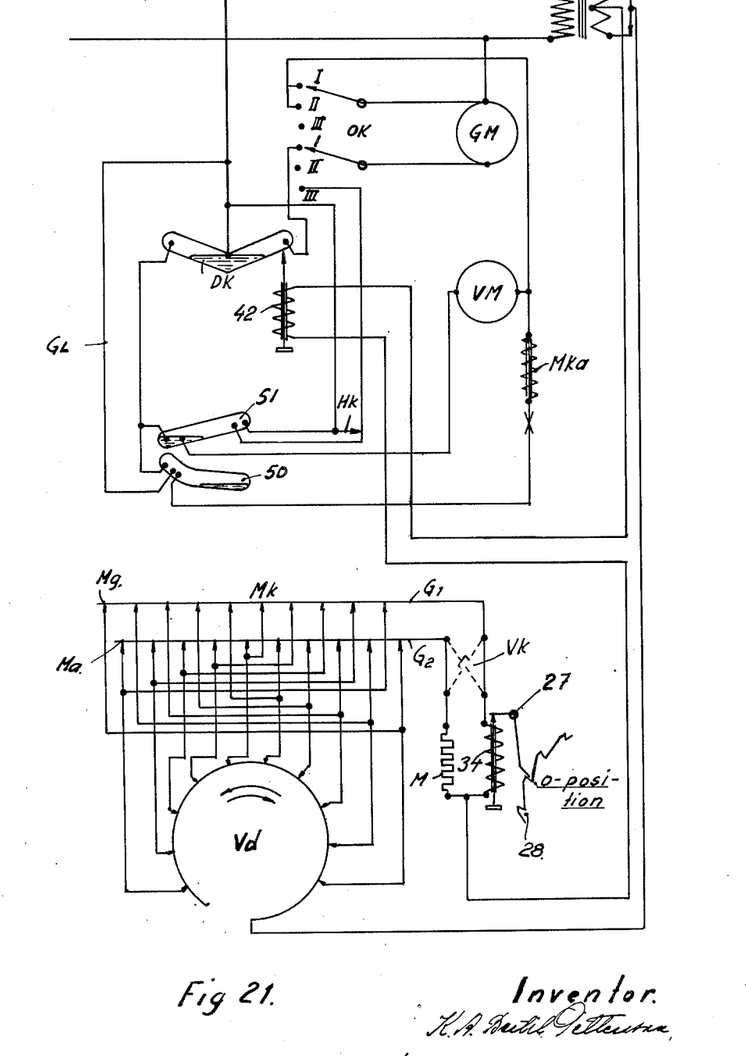
Fig. 21 is a wiring diagram.

The change-over switch V$k$, Fig. 20, is controlled by two pins 41 on the jaw, Fig. 8, and serves for alternately connecting a resistance M, Fig. 21, and the electromagnet 34 to two lines G$_1$ and G$_2$. As appears from Fig. 21, the control switches M$k$ are divided into two groups connected to G$_1$ and G$_2$, respectively. In the selector this corresponds to the two sides of the records. If, with the control switch for a certain piece of music closed, the circuit goes through the resistance M, the electromagnet 34 is deenergized and the pawl 27 stops the selector mechanism in the 0-position so that the stack is turned upside-down. When after the turning has been effected the jaw reaches its bottom position it actuates the change-over switch by means of one of the pins 41 and the electromagnet 34 is connected into the circuit. The pawl 27 is raised and the selector-mechanism starts, etc. As shown in Fig. 20, the change-over switch is actuated by a lever, which turns on a screw pin. The lever is provided with two lugs which are actuated by the pins 41. From Fig. 20 it appears that the pins must alternately press against the lugs in order that the switch be reversed in one direction or the other. Furthermore, from the position of the pins on the jaw, Fig. 8, it will be understood that the jaw must be turned each time, if the said condition shall be fulfilled. Thus the change-over switch is reversed only after the stack of record has been turned.

Figure 19:
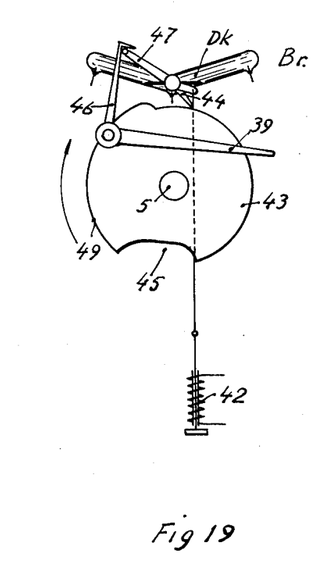
Fig. 19 is a diagrammatical view of the twin contact and its cam disc.

For controlling the selector motor V$m$ and the phonograph motor G$m$ there is a twin contact Dk, Fig. 19. This twin contact is actuated by the electromagnet 42 and also by a cam disc 43. The cam disc is mounted on the shaft 5. A wing 44 mounted on the contact shaft slides on the cam disc when this is turned by the shaft. A spring, or alternatively the weight of the armature of the electromagnet, tends to turn the contact for switching on the phonograph motor simultaneously as it keeps the wing in engagement with the cam disc. The cam disc has a notch 45 and a cam portion 49. The rest of the periphery of the cam disc is such that the contact is kept in the break position Br by the wing. An impulse for starting the selector motor is obtained from the electromagnet which tilts the contact so that the circuit through said motor is closed. The cam 49 is adapted, after the selector motor has been started, to keep the contact in this position until the phonograph motor is switched on. The cam disc 43 is so mounted on the shaft 5 that the wing 44 will slide into the notch when the crank mechanism is somewhat ahead of its upper dead center. The contact then tilts into the other position and the circuit through the phonograph motor is closed (phonograph position of the contact). On the contact shaft there is also an arm 47. This is engaged by a hook 46 on the arm 39 previously described when the selector mechanism stops in the 0-position. This device prevents the contact from tilting into the phonograph position during the turning cycle (for turning the stack of records the crank mechanism must make a full revolution). From the first selecting position and onwards the arm 39 is raised by its spring, as previously described. In these positions the contact can freely tilt into the phonograph position since the hook 46 is then out of engagement with the arm 47.

Figure 18:
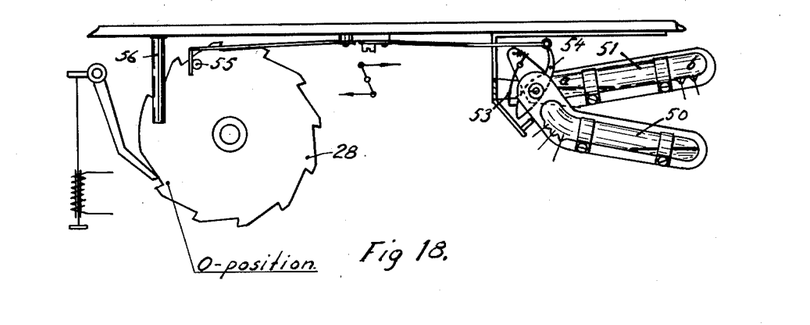
Fig. 18 shows the tone arm contact and a control device actuated by a ratchet wheel in the selector mechanism.

With the tone arm two contacts 50 and 51, Fig. 18, cooperate. The contact 50 has three functions, viz (1) to close the circuit through the selector motor when the tone arm has returned to its initial position (position of rest) after playing, (2) to break the circuit through the selector motor immediately ahead of the lower dead center of the crank mechanism, so that the pawl of the ratchet wheel 28 lies freely in the 0-position and (3) to send an impulse to an optional device Mka, Fig. 21, for automatic selection. Functions (1) and (3) are controlled by the tone arm function (2) by the selector mechanism, for instance the ratchet wheel. The contact 51a breaks the current to the selector motor at a second place when the tone arm has left its position of rest, and the contact 51b switches on the phonograph motor when normal playing is to take place. (With the phonograph records may be played having larger diameter than those in the stack. These records are played non-automatically just as in a common phonograph.) Fig. 18 shows an embodiment of the said contacts arranged on a common shaft. Contact 51 is fixedly connected to the shaft whereas contact 50 is movably arranged thereon and may move into the position (breaking position) shown in Fig. 18 by its own weight or under the influence of a spring. The plate to which the contact 51 is secured has a hook 53 which may engage a notch in the plate carrying the contact 50. The hook is moved out of the notch by an arm 54 which is controlled by a pin 55 on the ratchet wheel 28.

The shaft for the contacts 50 and 51 is connected to the frame 57, Fig. 2, in such a manner that the contact 51 is lowered when the tone arm moves towards the record. The hook 53 then engages the notch in the plate carrying the contact 50. When the tone arm returns, the contact 51 returns to the initial position but through the hook it moves the contact 51 along with it. This contact switches on the selector motor Vm through a branch line GL, Fig. 21. When the crank mechanism is immediately ahead of its lower dead center the contact 51 is released and the selector motor is stopped.

Due to the turning of the stack each record has two selecting positions. Therefore the selecting positions of the jaws must be correspondingly changed after the stack has been turned. This is accomplished by using a particular arrangement of the control switches in cooperation with the change-over switch Vk. The two control switches corresponding to different selecting positions for the two sides of each record are designated Ma and Mb, Fig. 21. The remaining control switches along G1 and G2 correspond in pairs to the sequence of different selecting positions of the jaws for the records in the stack. When the stack is turned upside-down the topmost record will be located at the bottom, the record next to the topmost record will be located next to the lowermost record, and so on. The control switches are interconnected according to the same system. The first contact on G1 is connected to the last contact on G2, the next contact on G1 to the last but one contact on G2 etc. The control switches consist of metallic tongues which may be actuated by means of push buttons, for instance. Furthermore an automatic member, for instance a roll with a number of cams, may be adapted to actuate the contact tongues in sequence, the displacement from one position to another position being effected through an impulse from the contact 50 to a step-by-step magnet Mka, Fig. 21, for instance.

The switch Ok is in the form of a tumbler switch having three positions I, II and III, respectively. The contact arms are interconnected and are moved simultaneously by a tumbler arm. In position I both the selector motor Vm and the phonograph motor Gm, in position II only the selector motor and in the position III only the phonograph motor, may be switched on.

The mode of operation of the selector is as follows.

If the switch Ok is in position I, the selector is set for selecting and playing of the records in the stack. If the control knob of the contact Ma, Fig. 21, is depressed a circuit is closed from a transformer T through rectifier L, selector box Vd, control switch Ma, change-over switch Vk (this is assumed to be in the position in which current flows through electromagnet 34), electromagnet 42 and back to transformer T. Electromagnet 34 therefore moves the pawl 27 out of its 0-position in the ratchet wheel 28, and electromagnet 42 tilts the twin contact Dk so that the circuit through the selector motor is closed. This circuit is from the mains, through twin contact Dk, contact 51a, selector motor Vm, switch Ok in the I-position and back to the mains. The selector motor starts and rotates the crank mechanism and the selector mechanism starts working. The control circuit through the selector box Vd goes over the first contact tongue. The breaking notch 31, Fig. 16, breaks the same and the pawl 27 drops into the second notch of the ratchet wheel (notch No. 1, Fig. 13). Simultaneously the electromagnet 42 is deenergized. The cam 49 on the cam disc 43 keeps the contact Dk in its position. The jaws leave one record on the turntable, the other records being raised. The selector mechanism not having stopped in the 0-position, the turning controller Vr does not actuate the turning mechanism of the jaw. When the crank mechanism is about to attain the upper dead center, the wing 44 slides into the notch 45 in the cam disc 43, Fig. 19, and the contact Dk tilts into the phonograph position so that the selector motor is stopped and the phonograph motor is started. The tone arm moves towards the record, the contact 51 breaks the circuit through the selector motor Vm at a second place and the record is played. While the record is being played another control knob may be depressed, for instance the knob of the contact Mb, Fig. 21. This corresponds to the other side of the record being played. The circuit is now closed but this time through resistance M. However, the electromagnet 42 is unable to actuate the contact Dk, the latter being in the phonograph position. In the said position the armature of the magnet 42 is so far away from its core that it cannot be actuated by the circuit. This is seen from Fig. 19. Furthermore the selector motor has been switched off through the contact 51. When the record has been played the tone arm returns to its position of rest. The contact 51 reestablishes the connection with the selector motor, and the contact 50 breaks the current through said motor through a branch line GL. The selector motor starts, the contact Dk is urged into the breaking position by the cam disc 43, Fig. 19, and the phonograph motor stops. When the contact Dk is urged into the breaking position the armature of the electromagnet 42 is moved so close to the core thereof that it may be actuated by the control circuit. The contact Dk immediately tilts and closes the circuit through the selector motor Vm also this way. When the jaws have put the raised portion of the stack in its place and the crank mechanism is about to attain its lower dead center, the contact 50 is released. The circuit through branch line GL is broken but the connection through contact Dk remains so that the selector motor does not stop. The stack of records has not been turned and therefore the change-over switch Vk is not actuated. As stated above the circuit now is through the resistance M, contact Mb not being connected to the other line. The electromagnet 34 is deenergized and the pawl 27 stops the selector mechanism in the 0-position so that the jaws turn the whole stack upside-down (as explained above the turning controller Vr does not actuate the turning mechanism of the jaw when the selector mechanism has stopped in the 0-position). When, after the turning of the stack, the jaws attain their bottom position the change-over switch is reversed by the pin 41 on the jaw and the circuit is changed to go through the electromagnet 34. The circuit through the selector box Vd goes through the control switch Mb over the tenth contact tongue. The selector mechanism stops at the last notch in the ratchet wheel 28 (notch No. 10, Fig. 13). The topmost record in the stack is raised. The record is played etc.

In non-automatic playing the switch Ok is first moved to position II. If the control switch Ma Fig. 21, is closed, selection occurs as above described but the phonograph motor does not start. The switch Ok is moved into position III causing the selector motor to be switched off whereas connection is established to the phonograph motor. If now a record, which may be of larger size, is placed upon that record which lies in the plate on the turntable and if a contact Hk is closed, the phonograph motor starts. The tone arm moves towards the record and the contact 51 is lowered whereupon there is no need to keep the contact Hk closed any longer. When the tone arm has returned to its position of rest the contact 51 is raised and the phonograph motor stops.

The selector may be modified in various ways. For instance the spring 25 actuating the selector mechanism may be replaced by a weight or by a friction device interposed between the shaft 5 of the crank mechanism and the shaft 23 of the selector mechanism and tending to turn the selector shaft 23 in the same direction as the spring.

What I claim is:

1. In an automatic phonograph, a turntable adapted to carry a stack of records, a selector mechanism for selecting one side of a record in said stack to be played, a structure comprising vertical guides on opposite sides of said turntable and spaced therefrom, an elevator slidably mounted on each guide, a gripper carried by each elevator and being movable therein towards and away from the stack of records and also rotatable, means controlled by said selector mechanism for raising the elevators to a desired gripping height for moving said grippers into engagement with a portion of the stack of records and for further raising said elevators to separate the gripped portion of the stack from the remainder of the records on the turntable to permit playing of the upper side of the topmost record thereon, and means controlled by the selector mechanism for first causing the grippers to grip and raise the entire stack of records, for rotating the grippers to turn the entire stack upside-down and for placing the stack back on the turntable if the selected record side is turned downwards in the stack.

2. An automatic phonograph according to claim 1, comprising a motor for raising said elevators, a crank mechanism between said motor and said elevators, means including a toothed segment and a rack between said crank mechanism and said grippers for moving the grippers to the gripping position when the crank mechanism is operated, and means including a gear and a rack driven by said motor for independently raising said elevators to a desired gripping height and for preventing said crank mechanism from operating the grippers until said desired height has been attained.

3. An automatic phonograph according to claim 1, in which each gripper is mounted in its elevator upon a shaft that is rotatable and longitudinally displaceable, said shaft carrying a cog wheel, two racks being provided slidably mounted in at least one of the elevators and engaging the cog wheel therein, one of the racks in the normal position of the stack on the turntable being raised so as to extend above the elevator, a stack turning member cooperating with said racks movably mounted at the top of said guide structure, and a locking member for said stack turning member, whereby when the latter is locked and the elevators together with the stack of records are raised to their topmost position said stack turning member by depressing the raised rack will rotate the grippers and the stack through 180°.

4. An automatic phonograph according to claim 1, wherein stop means are provided engaging the outer ends of said grippers for preventing outward movement thereof and keeping them in the stack gripping position arranged on said guide structure along the upper portion of the path of the elevators.

5. An automatic phonograph according to claim 1, in which each gripper is mounted in its elevator upon a shaft that is rotatable and longitudinally displaceable, said shaft carrying a cog wheel, two racks being slidably mounted in at least one of the elevators and engaging the cog wheel therein, one of the racks in the normal position of the stack on the turntable being raised to extend above the elevator, a detent being provided in the elevator for each rack which in the raised position of the rack engages a notch made therein, means including a spring-actuated cam rod movably mounted in each rack for actuating said detent to release the rack, said cam rod extending above the upper end of the rack, a stack turning member cooperating with said racks movably mounted at the top of said guide structure, and a locking member for said stack turning member, whereby when the latter is locked and the elevators together with the stack are raised to their topmost position said stack turning member first depresses the cam rod to release the rack and then causes the rack to move downwardly to rotate the grippers and the stack through 180°.

6. An automatic phonograph according to claim 1, wherein said selector mechanism comprises a number of contacts, each corresponding to a side of a record in the stack on the turntable, said contacts being divided into two groups with the contacts of each group connected to a separate group line and with the contacts of the two group lines interconnected in pairs with the first contact of the first group line connected to the last contact of the second group line, the second contact of the first group line connected to the last but one contact of the second group line and so on corresponding to the sequence of the records when the stack is in its normal position and when the same has been turned upside-down, a selector box to which the pairs of contacts are connected and associated with electromagnet means for controlling the gripping height of the grippers, and a change-over switch for automatically connecting one of the group lines to said electromagnetic means when the stack of records is in its normal position and for connecting the other group line to the electromagnetic means when said stack is turned upside-down so as to cause the grippers always to grip and raise the portion of the stack above the selected record side.

KARL ALBIN BERTIL PETTERSSON.

REFERENCES CITED

The following references are of record in the file of this patent:

UNITED STATES PATENTS

| Number | Name | Date |
|---|---|---|
| 1,925,402 | Polokoff | Sept. 5, 1933 |
| 1,964,336 | Wilber | June 26, 1934 |
| 2,251,381 | Wright | Aug. 5, 1941 |
| 2,272,453 | Wilcox | Feb. 10, 1942 |
| 2,291,538 | Ebert | July 28, 1942 |